US012561919B2

(12) United States Patent
Di et al.

(10) Patent No.: US 12,561,919 B2
(45) Date of Patent: Feb. 24, 2026

(54) SYSTEM AND METHOD OF CORRECTING DEPTH OF FIELD FOR MIXED REALITY HEAD-MOUNTED DEVICE

(71) Applicant: INSTITUTE FOR INFORMATION INDUSTRY, Taipei City (TW)

(72) Inventors: Min Di, Taipei City (TW); Ti-Hung Ku, Taipei City (TW); Jing Tong Fu, Taipei City (TW); Ming-Fang Weng, Kinmen County (TW)

(73) Assignee: INSTITUTE FOR INFORMATION INDUSTRY, Taipei City (TW)

( * ) Notice: Subject to any disclaimer, the term of this patent is extended or adjusted under 35 U.S.C. 154(b) by 233 days.

(21) Appl. No.: 18/530,073

(22) Filed: Dec. 5, 2023

(65) Prior Publication Data

US 2025/0139911 A1 May 1, 2025

(30) Foreign Application Priority Data

Oct. 31, 2023 (TW) ................................. 112141705

(51) Int. Cl.
| | |
|---|---|
| *G06T 19/00* | (2011.01) |
| *G06F 3/01* | (2006.01) |
| *G06F 3/14* | (2006.01) |
| *G06T 5/50* | (2006.01) |
| *G06V 10/74* | (2022.01) |

(52) U.S. Cl.
CPC ............ *G06T 19/006* (2013.01); *G06F 3/013* (2013.01); *G06F 3/14* (2013.01); *G06T 5/50* (2013.01); *G06V 10/761* (2022.01); *G06T 2207/20221* (2013.01)

(58) Field of Classification Search
CPC ..................... G06T 19/006; G06T 5/50; G06T 2207/20221; G06F 3/013; G06F 3/14; G06F 3/011; G06V 10/761
See application file for complete search history.

(56) References Cited

U.S. PATENT DOCUMENTS

| | | | |
|---|---|---|---|
| 2020/0027201 A1* | 1/2020 | Chen ......................... | G06T 7/90 |
| 2020/0393679 A1* | 12/2020 | Rönngren ............... | G06F 3/013 |

FOREIGN PATENT DOCUMENTS

| | | |
|---|---|---|
| CN | 111757089 A | 10/2020 |
| TW | 202008780 A | 2/2020 |

OTHER PUBLICATIONS

TW Office Action dated Apr. 30, 2025 in application No. 112141705.

* cited by examiner

*Primary Examiner* — Chong Wu
(74) *Attorney, Agent, or Firm* — Maschoff Brennan

(57) ABSTRACT

A method of correcting depth of field, performed by a first MR head-mounted device, comprises: superimposing a first virtual object on a first background image to generate an superimposed image, inputting the superimposed image into a depth-of-field correction model to generate a displayed image and display the displayed image, receiving at least one user feedback signal corresponding to the displayed image, and updating a depth-of-field parameter of the depth-of-field correction model with the at least one user feedback signal for the depth-of-field correction model to generate an updated virtual object.

16 Claims, 8 Drawing Sheets

10

101
image capturing element 102
storage element 103
input element processing device

104

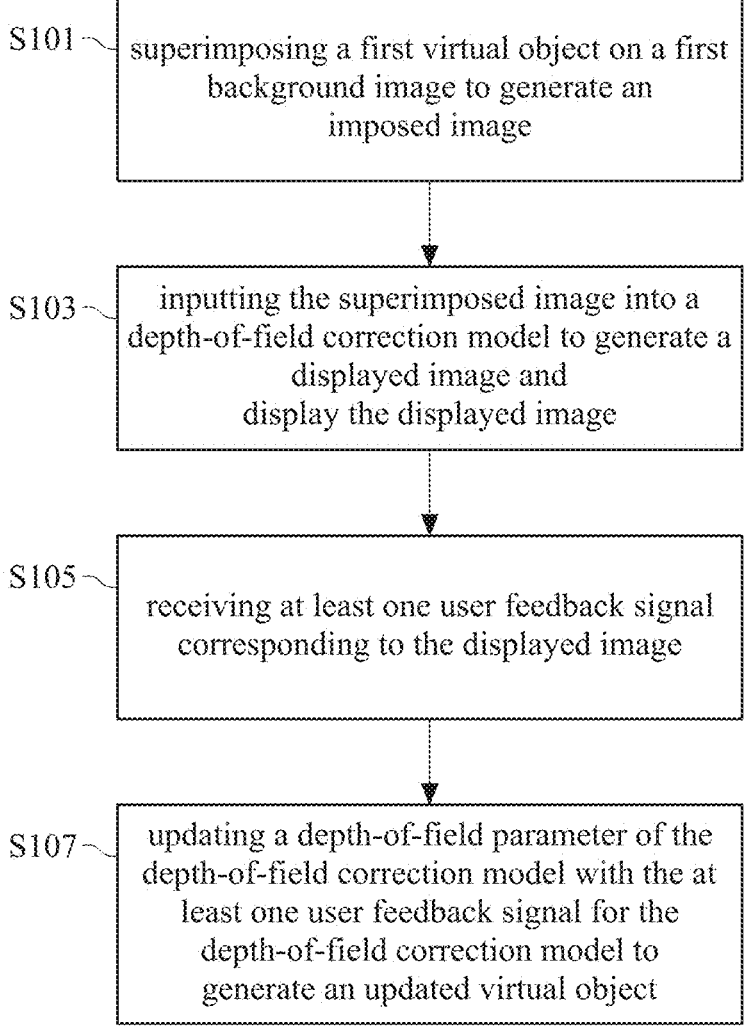

S101 — superimposing a first virtual object on a first background image to generate an imposed image S103 — inputting the superimposed image into a depth-of-field correction model to generate a displayed image and display the displayed image S105 — receiving at least one user feedback signal corresponding to the displayed image S107 — updating a depth-of-field parameter of the depth-of-field correction model with the at least one user feedback signal for the depth-of-field correction model to generate an updated virtual object

FIG. 2

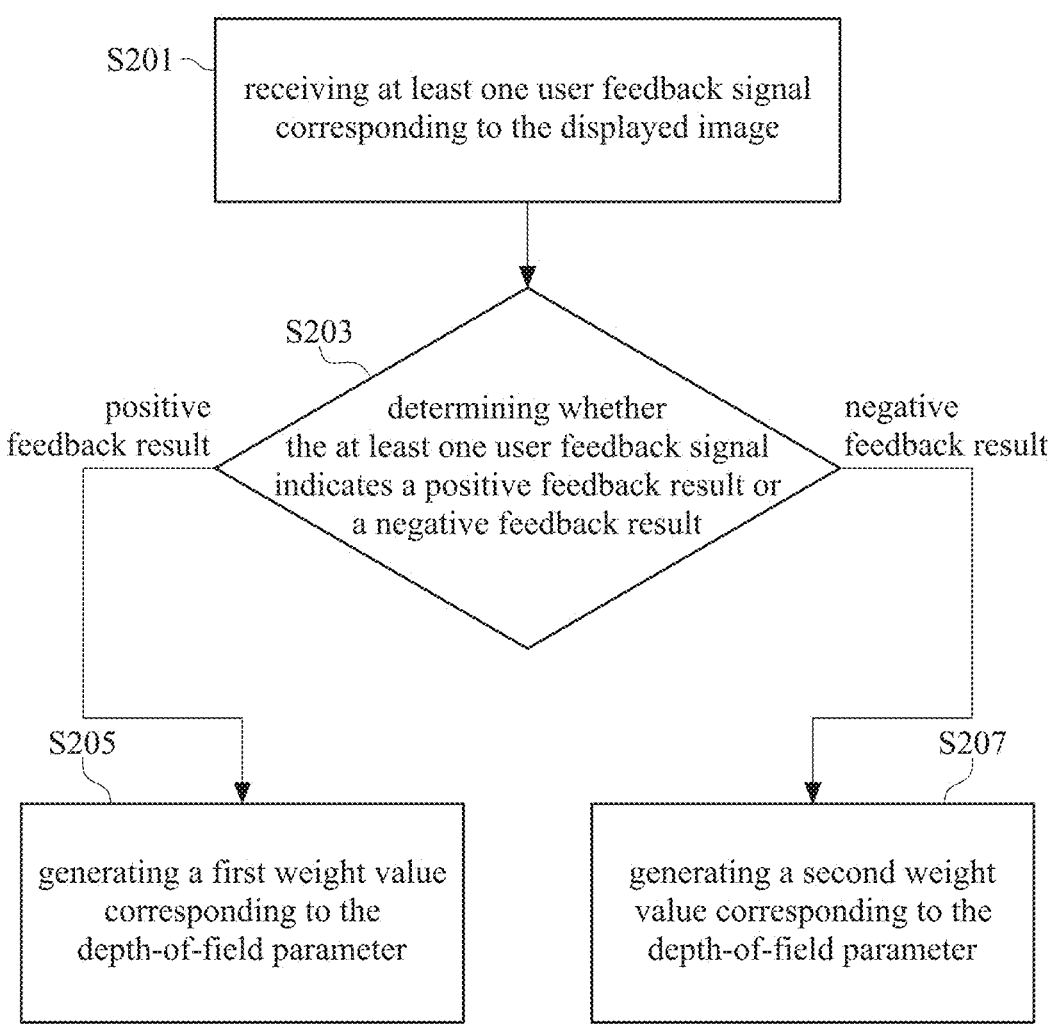

S201 — receiving at least one user feedback signal corresponding to the displayed image S203 — determining whether the at least one user feedback signal indicates a positive feedback result or a negative feedback result positive feedback result negative feedback result S205 — generating a first weight value corresponding to the depth-of-field parameter S207 — generating a second weight value corresponding to the depth-of-field parameter

FIG. 4

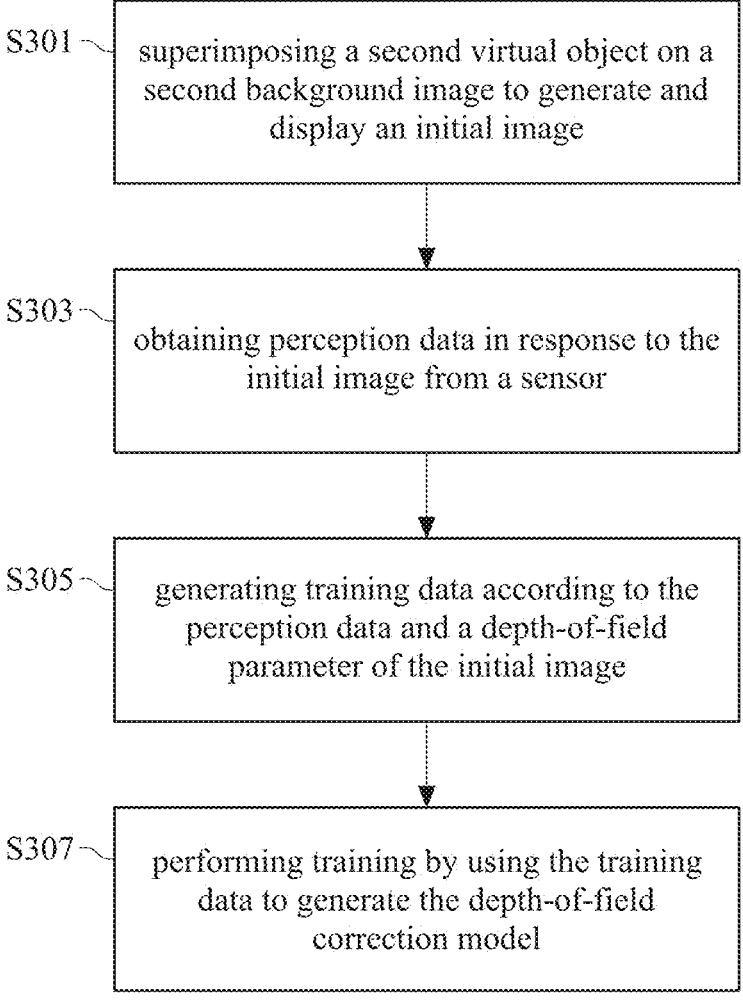

S301 — superimposing a second virtual object on a second background image to generate and display an initial image S303 — obtaining perception data in response to the initial image from a sensor S305 — generating training data according to the perception data and a depth-of-field parameter of the initial image S307 — performing training by using the training data to generate the depth-of-field correction model

FIG. 7

SYSTEM AND METHOD OF CORRECTING DEPTH OF FIELD FOR MIXED REALITY HEAD-MOUNTED DEVICE

CROSS-REFERENCE TO RELATED APPLICATIONS

This non-provisional application claims priority under 35 U.S.C. § 119(a) on Patent Application No(s). 112141705 filed in Republic of China (ROC) on Oct. 31, 2023, the entire contents of which are hereby incorporated by reference.

BACKGROUND

1. Technical Field

This disclosure relates to a mixed reality head-mounted device and system and method of correcting depth of field.

2. Related Art

Currently, mixed reality (MR) technology is becoming a trend and is gradually appearing in the public eye. The continued development of optical see-through (OST) MR head-mounted device brings people a more immersive MR experience. Through these outstanding technologies, users can experience a seamless and realistic integration between virtual objects and physical scenes.

At present, the main means for the depth of field effect presented by OST MR head-mounted device is to control the depth of field rendering effect on the screen based on structured light and/or stereoscopic vision. However, these control methods cannot match the user's real visual experience because there are no control indicators.

SUMMARY

Accordingly, this disclosure provides a MR head-mounted device and system and method of correcting depth of field.

According to one or more embodiment of this disclosure, a method of correcting depth of field, comprises performed by a first MR head-mounted device: superimposing a first virtual object on a first background image to generate an superimposed image; inputting the superimposed image into a depth-of-field correction model to generate a displayed image and display the displayed image; receiving at least one user feedback signal corresponding to the displayed image; and updating a depth-of-field parameter of the depth-of-field correction model with the at least one user feedback signal for the depth-of-field correction model to generate an updated virtual object.

According to one or more embodiment of this disclosure, a MR head-mounted device comprises an image capturing element, a storage element, an input element and a processing device. The image capturing element is configured to obtain a first background image. The storage element is configured to store a depth-of-field correction model. The input element is configured to obtain at least one user feedback signal. The processing device is connected to the image capturing element, the storage element and the input element, and is configured to perform: superimposing a first virtual object on the first background image to generate an superimposed image; inputting the superimposed image into the depth-of-field correction model to generate a displayed image and display the displayed image; receiving the at least one user feedback signal corresponding to the displayed image; and updating a depth-of-field parameter of the depth-of-field correction model with the at least one user feedback signal for the depth-of-field correction model to generate an updated virtual object.

According to one or more embodiment of this disclosure, a system of correcting depth of field comprises: a first MR head-mounted device, a second MR head-mounted device and a processing device. The first MR head-mounted device is the MR head-mounted device described above. The second MR head-mounted device is configured to obtain a second background image and comprises a sensor. The processing device is connected to the second MR head-mounted device and configured to perform: superimposing a second virtual object on the second background image to generate and display an initial image; obtaining perception data in response to the initial image from the sensor; generating training data according to the perception data and a depth-of-field parameter of the initial image; and performing training by using the training data to generate the depth-of-field correction model.

In view of the above description, the MR head-mounted device and the corresponding method of correcting depth of field according to one or more embodiments of the present disclosure may realize depth-of-field adjustment through the depth-of-field correction model, displayed image may be updated instantly to achieve more realistic effects. Further, by updating the depth-of-field correction model according to the user feedback signal instantly, the user's focus changes in different scenes may be ensured to immediately reflect on the virtual objects, and the user's requirement on visual experience may be met. The system of correcting depth of field according to one or more embodiments of the present disclosure may effectively build accurate depth-of-field correction model. Further, by building the depth-of-field correction model according to the perception data, the MR head-mounted device that is shipped out from the factory may display a MR image that meets user's expectation.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 2 is a flowchart illustrating a method of correcting depth of field according to an embodiment of the present disclosure;

FIG. 4 is a flowchart illustrating updating a depth-of-field parameter of a depth-of-field correction model with a user feedback signal according to an embodiment of the present disclosure;

FIG. 7 is a flowchart illustrating generating a depth-of-field correction model according to an embodiment of the present disclosure.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

It should be noted that the MR head-mounted device described below may be OST MR head-mounted device.

Figure 1:
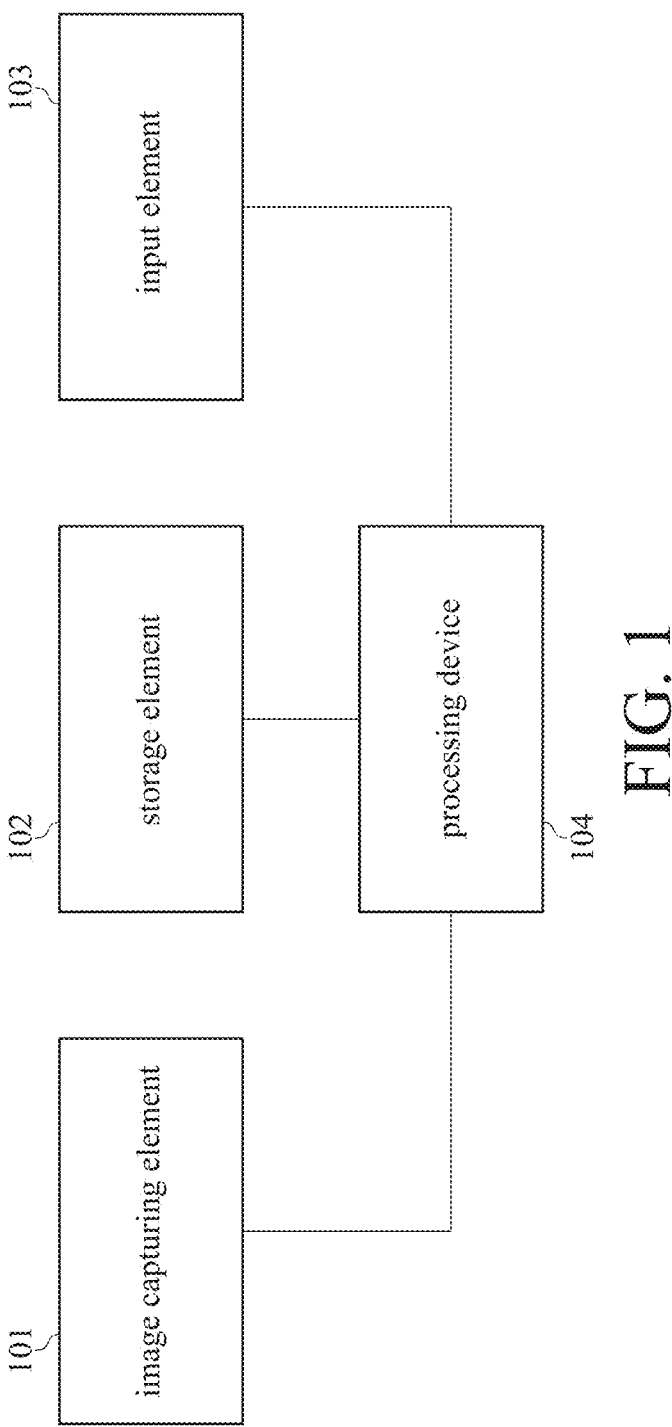
FIG. 1 is a block diagram illustrating a MR head-mounted device according to an embodiment of the present disclosure.

Please refer to FIG. 1, wherein FIG. 1 is a block diagram illustrating a MR head-mounted device 10 according to an embodiment of the present disclosure. As shown in FIG. 1, the MR head-mounted device 10 includes an image capturing element 101, a storage element 102, an input element 103 and a processing device 104. The processing device 104 is electrically connected to or in communication connection with the image capturing element 101, the storage element 102 and the input element 103.

The image capturing element 101 is a photographing element configured to obtain reality image. The storage element 102 may be a non-volatile memory (NVM), such as a read-only memory (ROM), a flash memory and/or a non-volatile random-access memory (NVRM) etc. The storage element 102 is configured to store a trained depth-of-field correction model. The depth-of-field correction model may be a convolutional neural network (CNN) model or a recurrent neural network (RNN) model, etc. The input element 103 is configured to obtain a user feedback signal. The input element 103 may be a touch screen, a keyboard or a mouse etc., the input element 103 is configured to receive user input data, wherein said touch screen may be a touch screen of a smart phone or a tablet. The input element 103 may be a sensing element configured to sense a user to obtain perception data associated with the user; or the input element 103 may be an image display element of the MR head-mounted device 10, and the image display element may display virtual image to receive the user feedback signal.

The processing device 104 may include one or more processors, wherein the processor is, for example, a central processing unit, a graphics processing unit, a microcontroller, a programmable logic controller or any other processor with signal processing functions. The processing device 104 is configured to update the trained depth-of-field correction model stored in the storage element 102 based on the user feedback signal, so that the updated depth-of-field correction model may be more adapted to the viewing requirements of each user.

To explain the operation of the MR head-mounted device 10 in more detail, please refer to FIG. 1 and FIG. 2, wherein FIG. 2 is a flowchart illustrating a method of correcting depth of field according to an embodiment of the present disclosure. As shown in FIG. 2, the method of correcting depth of field is performed by the MR head-mounted device 10 and includes: S101: superimposing a first virtual object on a first background image to generate an superimposed image; S103: inputting the superimposed image into a depth-of-field correction model to generate a displayed image and display the displayed image; S105: receiving at least one user feedback signal corresponding to the displayed image; and S107: updating a depth-of-field parameter of the depth-of-field correction model with the at least one user feedback signal for the depth-of-field correction model to generate an updated virtual object.

In step S101, the image capturing element 101 photographs the real environment to obtain a reality image, and the reality image may be used as the first background image. The processing device 104 is configured to perform superimposing the first virtual object on the first background image to generate the superimposed image. The first virtual object may be an object image pre-stored in the storage element 102, an object image obtained from the cloud by the processing device 104 or an object image generated by a generative artificial intelligent model, the present disclosure does not limit the source of the first virtual object.

In step S103, the processing device 104 is configured to perform inputting the superimposed image into the depth-of-field correction model stored in the storage element 102, for the depth-of-field correction model to generate the displayed image. The image display element of the MR head-mounted device 10 displays the displayed image for the user to view the display image. The displayed image includes the first background image and the corrected virtual object that is the same object as the first virtual object. The depth-of-field parameters of the displayed image and the superimposed image may be different from each other. Further, one or more of a depth parameter, a focal length parameter and an F number corresponding to the displayed image may be different from that of the superimposed image, and the corrected virtual object in the displayed image may be clearer than the first virtual object in the superimposed image.

In step S105, the input element 103 receives the user feedback signal corresponding to the displayed image, and outputs the user feedback signal to the processing device 104, wherein the user feedback signal indicates the user's viewing experience regarding the displayed image. As described above, the user feedback signal may be user input data or perception data of the user.

In step S107, the processing device 104 is configured to perform updating the depth-of-field correction model stored in the storage element 102 with the user feedback signal, so that the depth-of-field correction model generates another displayed image, and said another displayed image includes the updated virtual object. The content of said another displayed image may be the same as that of the displayed image generated in step S103, the difference is that the depth-of-field parameter of the updated virtual object may be more adapted to user's requirement than the virtual object in the displayed image generated in step S103 (for example, the updated virtual object is clearer).

In other words, the MR head-mounted device and the method of correcting depth of field according to the above embodiments may automatically adjust the depth-of-field parameter of the virtual object by using the depth-of-field correction model, thereby realizing natural and out-of-focus and/or blur effects corresponding to different depths. Whether it is detailed observation at close range or the vast experience of distant scene, the user may enjoy a richer and more realistic visual experience in MR.

Figure 3A:
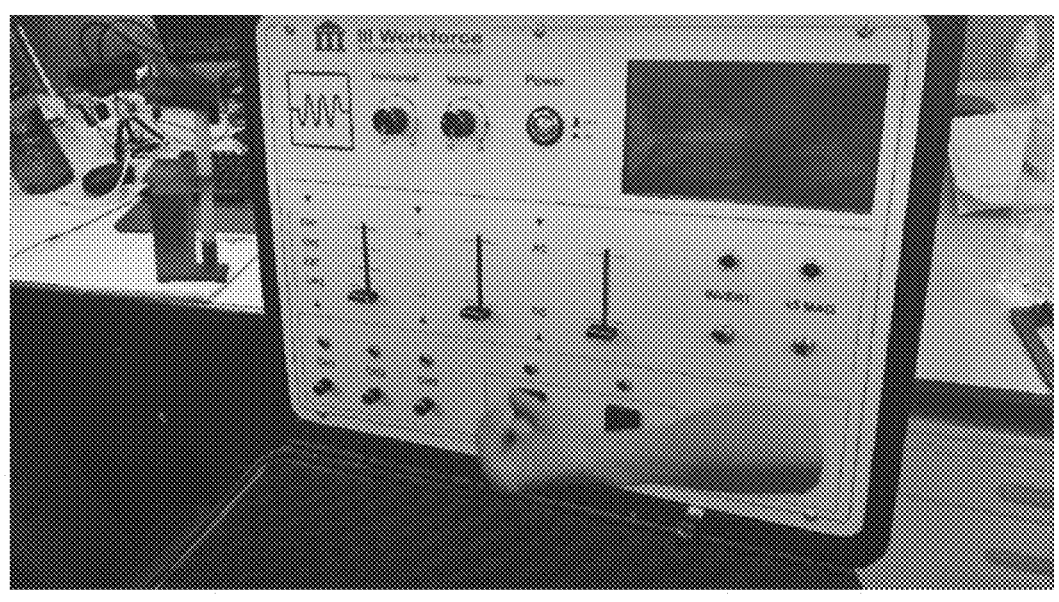
FIG. 3A is a schematic diagram showing a MR image with an uncorrected depth of field according to an embodiment of the present disclosure.
Figure 3B:
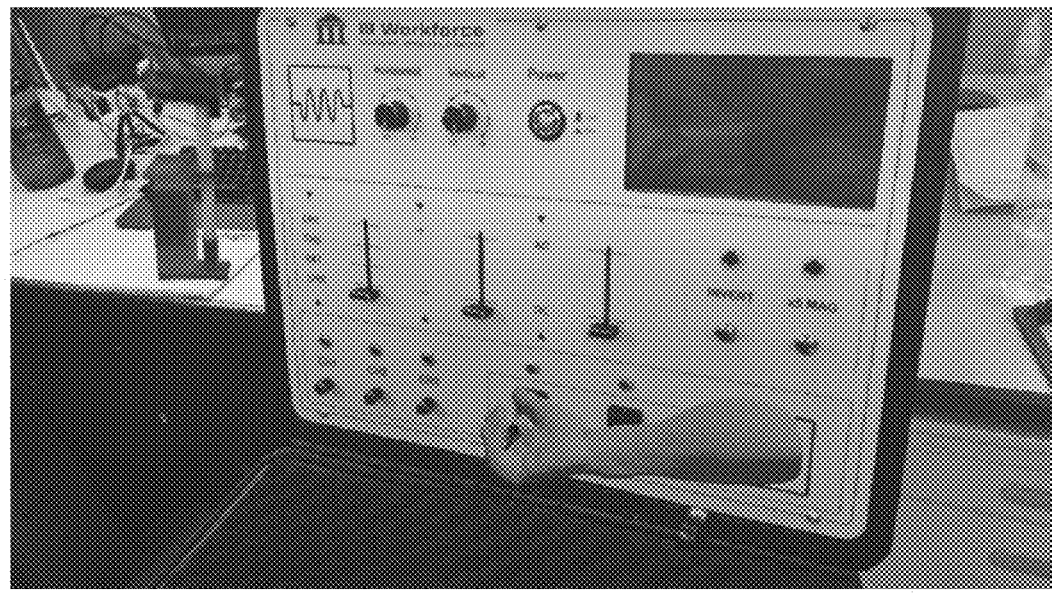
FIG. 3B is a schematic diagram showing a MR image with a corrected depth of field according to an embodiment of the present disclosure.

Please refer to FIG. 3A and FIG. 3B, wherein FIG. 3A is a schematic diagram showing a MR image with an uncorrected depth of field according to an embodiment of the present disclosure, and FIG. 3B is a schematic diagram showing a MR image with a corrected depth of field according to an embodiment of the present disclosure. In FIG. 3A and FIG. 3B, the arm is the virtual object, and the other part of the image is the background image. In the MR image with an uncorrected depth of field (FIG. 3A), the virtual object is blurry; and in the MR image with a corrected depth of field (FIG. 3B), the virtual object is obviously clearer than that of FIG. 3A.

Please refer to FIG. 1 and FIG. 4, wherein FIG. 4 is a flowchart illustrating updating a depth-of-field parameter of a depth-of-field correction model with a user feedback signal according to an embodiment of the present disclosure. As shown in FIG. 4, in the embodiment where the user feedback signal is user input data, the method of updating the depth-of-field parameter of the depth-of-field correction model includes: step S201: receiving at least one user feedback signal corresponding to the displayed image; step S203: determining whether the at least one user feedback signal indicates a positive feedback result or a negative feedback result; if the determination result of step S203 is "positive feedback result", performing step S205: generating a first weight value corresponding to the depth-of-field parameter; and if the determination result of step S203 is "negative feedback result", performing step S207: generating a second weight value corresponding to the depth-of-field parameter, wherein the first weight value is greater than the second weight value. Step S201 may be the same as step S105 of FIG. 2, its description is not repeated herein. Steps S203, S205 and S207 may be regarded as a detailed flowchart of an embodiment of step S107 of FIG. 2.

In step S203, the processing device 104 is configured to perform determining whether the user feedback signal is the positive feedback result or the negative feedback result, and the processing device 104 may perform such determination according to the command of the user input through the input element 103. The positive feedback result indicates that the depth-of-field parameter of the virtual object in the displayed image meets user's viewing requirement, and the negative feedback result indicates that the depth-of-field parameter of the virtual object in the displayed image does not meet user's viewing requirement. For example, the input element 103 is a touch screen, and the touch screen displays "clear" button and "not clear" button. Or, the input element 103 is an image display element of the MR head-mounted device 10, and the virtual image displayed by the image display element includes virtual "clear" button and virtual "not clear" button. The "clear" button may be the positive feedback result, and the "not clear" button may be the negative feedback result. The input element 103 may generate the user feedback signal corresponding to the triggered (clicked) button. The buttons and their corresponding relationships with the feedback results are only examples, the present disclosure is not limited thereto.

If the user feedback signal indicates the positive feedback result, then in step S205, the processing device 104 may generate the first weight value that is equal to or greater than 1, wherein the first weight value corresponds to the depth-of-field parameter used by the depth-of-field correction model. On the contrary, if the user feedback signal indicates the negative feedback result, then in step S207, the processing device 104 may generate the second weight value corresponding to the depth-of-field parameter used by the depth-of-field correction model, wherein the second weight value is smaller than the first weight value. Accordingly, the updated virtual object generated by the updated depth-of-field correction model may be more adapted to user's viewing requirement.

In addition, take the depth-of-field parameter including F number, a rendering range and a focal length as an example, if the determination result of step S203 is "negative feedback result", the processing device 104 may generate a plurality of frames of test images, and the test images may have combinations of different F numbers, rendering ranges, and focal lengths. Then, the processing device 104 receives a plurality of user feedback signals corresponding to said test images. When the user feedback signal of a test image indicates the positive feedback result, it means that the combination of the depth-of-field parameter (the F number, the rendering range and the focal length) corresponding to the test image is a proper combination, and the processing device 104 performs step S205 on the depth-of-field parameter of the test image. On the contrary, when the user feedback signal indicates the negative feedback result, it means that the combination of the depth-of-field parameter (the F number, the rendering range and the focal length) corresponding to the test image may not be a proper combination, and the processing device 104 performs step S207 on the depth-of-field parameter of the test image. The processing device 104 may use the above result to retrain the depth-of-field correction model stored in the storage element 102. Therefore, the depth-of-field correction model may avoid using the combination with the negative feedback result when generating the next displayed image.

Figure 5:
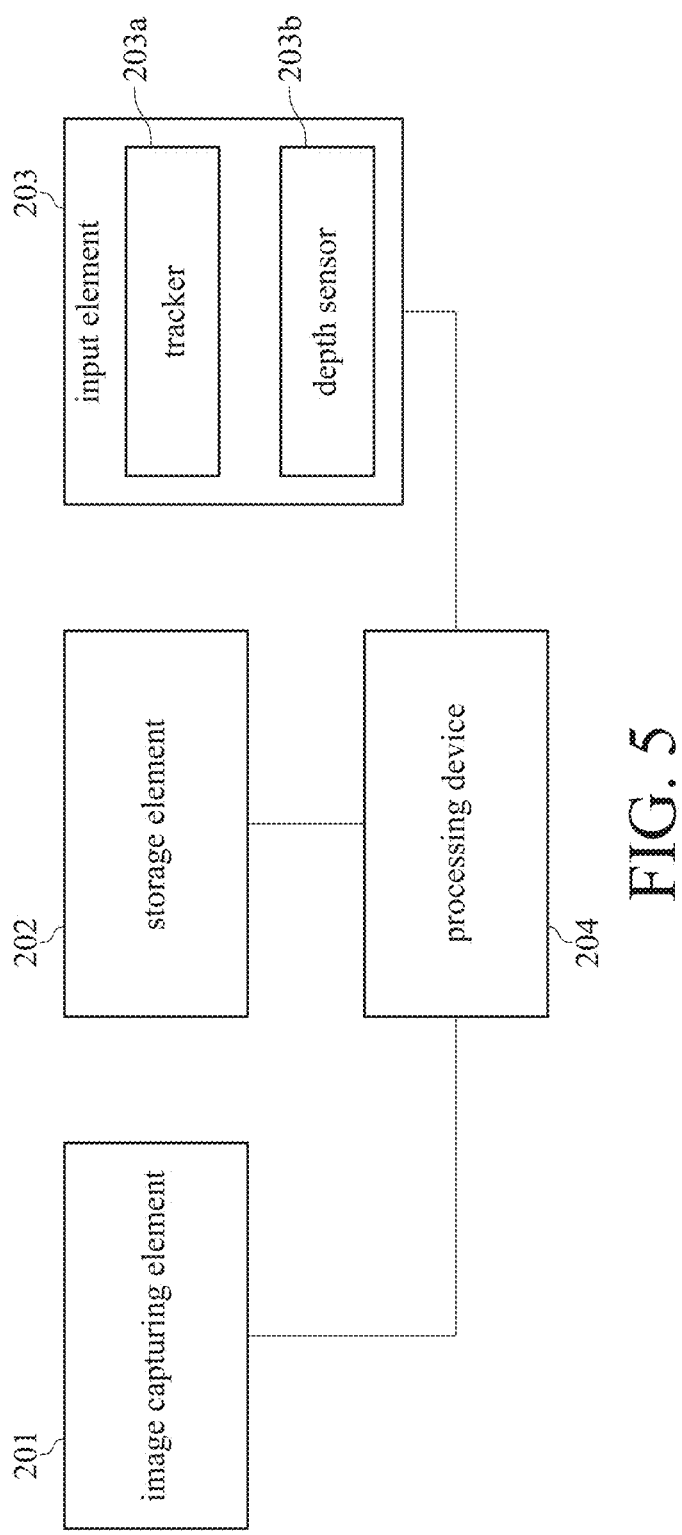
FIG. 5 is a block diagram illustrating a MR head-mounted device according to another embodiment of the present disclosure.

Please refer to FIG. 5, wherein FIG. 5 is a block diagram illustrating a MR head-mounted device 20 according to another embodiment of the present disclosure. As shown in FIG. 5, the MR head-mounted device 20 includes an image capturing element 201, a storage element 202, an input element 203 and a processing device 204. The implementations of the image capturing element 201, the storage element 202 and the processing device 204 may be the same as that of the image capturing element 101, the storage element 102 and the processing device 104 of FIG. 1, their descriptions are not repeated herein.

As shown in FIG. 5, when the input element 203 is a sensing element, the input element 203 may include an eye tracker 203a and a depth sensor 203b.

In the embodiment of the eye tracker 203a, the user feedback signal may be a pupil size of the user, and the depth-of-field parameter of the depth-of-field correction model may include the F number. When performing step S107 of FIG. 2, the processing device 204 is configured to perform determining whether the pupil size is greater than an upper limit or smaller than a lower limit. The processing device 204 retrains the depth-of-field correction model when determining that the pupil size is greater than the upper limit to increase the F number, and retrains the depth-of-field correction model when determining that the pupil size is smaller than the lower limit to decrease the F number. In other words, when the pupil size is greater than the upper limit, it means that the current F number may not be enough, which causes a depth of field that is deeper than user requirement. Therefore, the F number of the retrained depth-of-field correction model may be increased. On the contrary, when the pupil size is smaller than the lower limit, it means that the current F number may be too high, which causes a depth of field that is not deep enough. Therefore, the F number of the retrained depth-of-field correction model may be decreased. The interval between the upper limit and the lower limit may be a normal interval. That is, when the pupil size falls within the normal range, the F number may not be adjusted.

In the embodiment of the eye tracker 203a, the user feedback signal is an eye focus location of the user, and the depth-of-field parameter of the depth-of-field correction model may include the rendering range. When performing step S107 of FIG. 2, the processing device 204 may first determine whether the eye focus location overlaps the first virtual object, and retrain the depth-of-field correction model to adjust the rendering range when determining that the eye focus location does not overlap the first virtual object. In other words, the processing device 204 retrains the depth-of-field correction model when determining that the eye focus location is not mapped onto the first virtual object, thereby adjusting the depth-of-field parameter of the depth-of-field correction model.

In the embodiment of the depth sensor 203b, the user feedback signal is a depth distance between the MR head-mounted device 20 and a physical object in the first background image, and the depth-of-field parameter of the depth-of-field correction model may include the focal length. When performing step S107 of FIG. 2, the processing device 204 may retrain the depth-of-field correction model according to the depth distance to adjust the focal length. For example, when the depth distance is higher (or greater), the processing device 204 may adjust the focal length to a higher value.

Further, the processing device 204 may store the depth-of-field parameter of the depth-of-field correction model as the current F number, rendering range and/or focal length when determining that the user feedback signal indicates the positive feedback result; and the processing device 204 may adjust the depth-of-field parameter according to one or more embodiments described above when determining that the user feedback signal indicates the negative feedback result, and then store the depth-of-field parameter of the depth-of-field correction model as the updated depth-of-field parameter.

In other words, in the embodiment where the input element 203 includes the eye tracker 203a and the depth sensor 203b at the same time (meaning the user feedback signal includes the pupil size, the eye focus location and the depth distance at the same time), when the user feedback signal indicates the positive feedback result, it means that the combination of the depth-of-field parameter of the depth-of-field correction model (the F number, the rendering range and the focal length) is a proper combination; on the contrary, when the user feedback signal indicates the negative feedback result, it means that the combination of the depth-of-field parameter of the depth-of-field correction model (the F number, the rendering range and the focal length) may not be a proper combination, and therefore, the depth-of-field correction model may avoid using the combination with the negative feedback result when generating the next displayed image.

Figure 6:
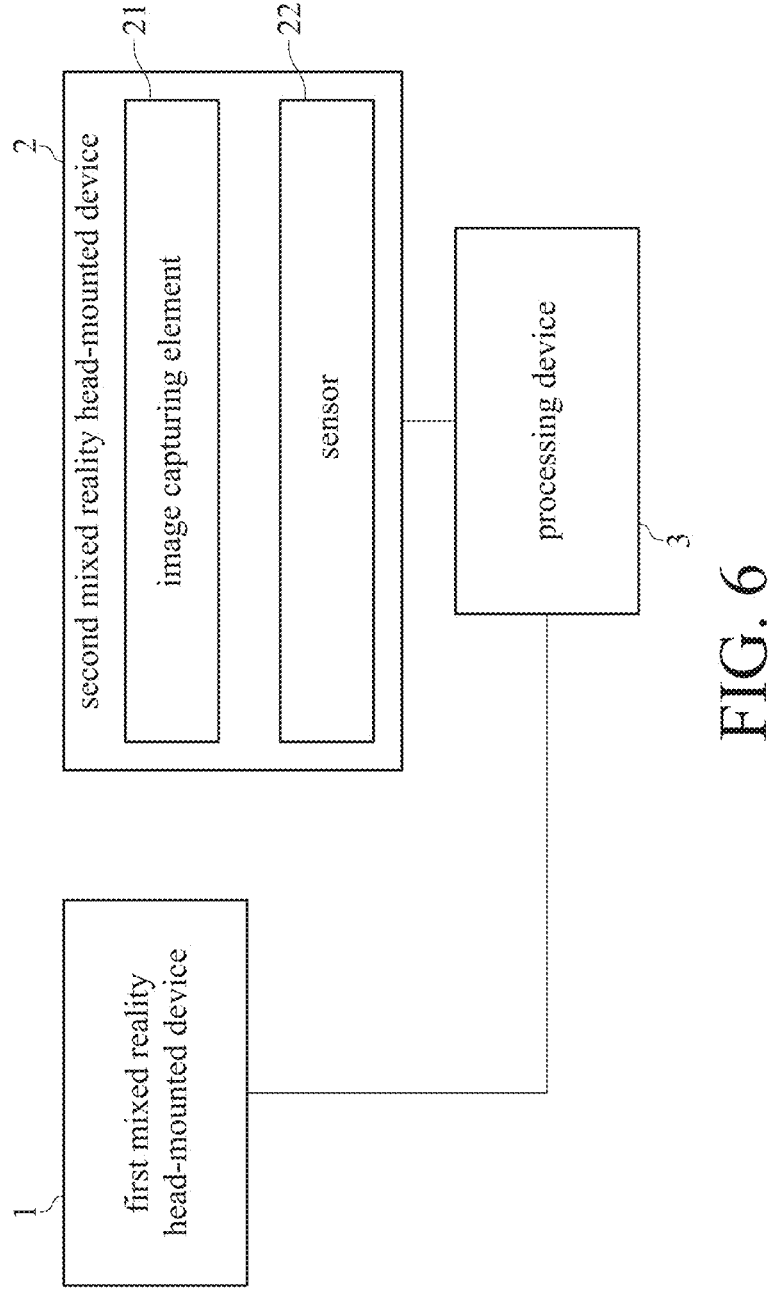
FIG. 6 is a block diagram illustrating a system of correcting depth of field according to an embodiment of the present disclosure.

Please refer to FIG. 6, wherein FIG. 6 is a block diagram illustrating a system 100 of correcting depth of field according to an embodiment of the present disclosure. As shown in FIG. 6, the system 100 of correcting depth of field includes a first MR head-mounted device 1, a second MR head-mounted device 2 and a processing device 3. The processing device 3 is connected to the first MR head-mounted device 1 and the second MR head-mounted device 2. The first MR head-mounted device 1 is the MR head-mounted device 10 or the MR head-mounted device 20 according to one or more embodiments described above. The second MR head-mounted device 2 includes the image capturing element 21 and a sensor 22. The image capturing element 21 is configured to obtain a second background image. The sensor 22 is embedded on a shell of the second MR head-mounted device 2 (for example, glasses equipment). The sensor 22 may be a sensing element. The sensor 22 is configured to perform sensing to generate perception data associated with the user. Further, the sensor 22 may be implemented by the input element 103 described in the above one or more embodiments. Further, the second MR head-mounted device 2 may be the MR head-mounted device 10 or the MR head-mounted device 20 according to one or more embodiments described above. The processing device 3 may be a server and may include one or more processors, wherein the processor is, for example, a central processing unit, a graphics processing unit, a microcontroller, a programmable logic controller or any other processor with signal processing functions. The first MR head-mounted device 1 of the system 100 of correcting depth of field may be the MR head-mounted device shipped out from the factory, and the second MR head-mounted device 2 may be a MR head-mounted device used in the factory to build said depth-of-field correction model.

To explain the operation of the system 100 of correcting depth of field in more detail, please refer to FIG. 6 and FIG. 7, wherein FIG. 7 is a flowchart illustrating generating a depth-of-field correction model according to an embodiment of the present disclosure. As shown in FIG. 7, the method of generating the depth-of-field correction model is performed by the system 100 of correcting depth of field, and includes: step S301: superimposing a second virtual object on a second background image to generate and display an initial image; step S303: obtaining perception data in response to the initial image from a sensor; step S305: generating training data according to the perception data and a depth-of-field parameter of the initial image; and step S307: performing training by using the training data to generate the depth-of-field correction model.

In step S301, the image capturing element of the second MR head-mounted device 2 photographs the real environment to obtain a reality image, and the reality image may be used as the second background image. The processing device 3 is configured to perform superimposing the second virtual object on the second background image to generate the initial image, and the image display element of the second MR head-mounted device 2 displays the initial image for user viewing. The method of generating the second virtual object may be the same as that of the first virtual object, its descriptions are not repeated herein.

In step S303, the processing device 3 is configured to perform obtaining the perception data from the sensor 22 of the second MR head-mounted device 2, wherein the perception data is generated in response to the initial image. As described above, the perception data may be data associated with the user generated by sensing the user. The perception data indicates the user's perception on the depth-of-field of the initial image.

In step S305, the processing device 3 generates the training data according to the perception data and the depth-of-field parameter of the initial image. For example, if the perception data indicates that the depth of field of the initial image is not enough, the processing device 3 may use the determination result (the depth of field of the initial image is not enough) and the depth-of-field parameter of the initial image as the training data. Therefore, the trained depth-of-field correction model may increase the corresponding value(s) of the depth-of-field parameter of the image during operation. If the perception data indicates that the depth of field of the initial image is enough, the processing device 3 may use the determination result (the depth of field of the initial image is enough) and the depth-of-field parameter of the initial image as the training data. Therefore, the trained depth-of-field correction model may maintain the corresponding value(s) of the depth-of-field parameter of the image during operation.

In step S307, the processing device 3 uses the training data to perform training to generate the depth-of-field correction model, and stores the trained depth-of-field correction model into the storage element of the first MR head-mounted device 1. The depth-of-field correction model may be a CNN model or a RNN model etc.

Accordingly, by combining the two-stage process of sensing collection (generating the depth-of-field correction model based on the second MR head-mounted device) and evaluation verification (correcting the depth-of-field parameter of the depth-of-field correction model based on the first MR head-mounted device), it is possible to automatically control the depth of field of MR image to achieve natural defocus and blur effects on objects at different depths.

Figure 8:
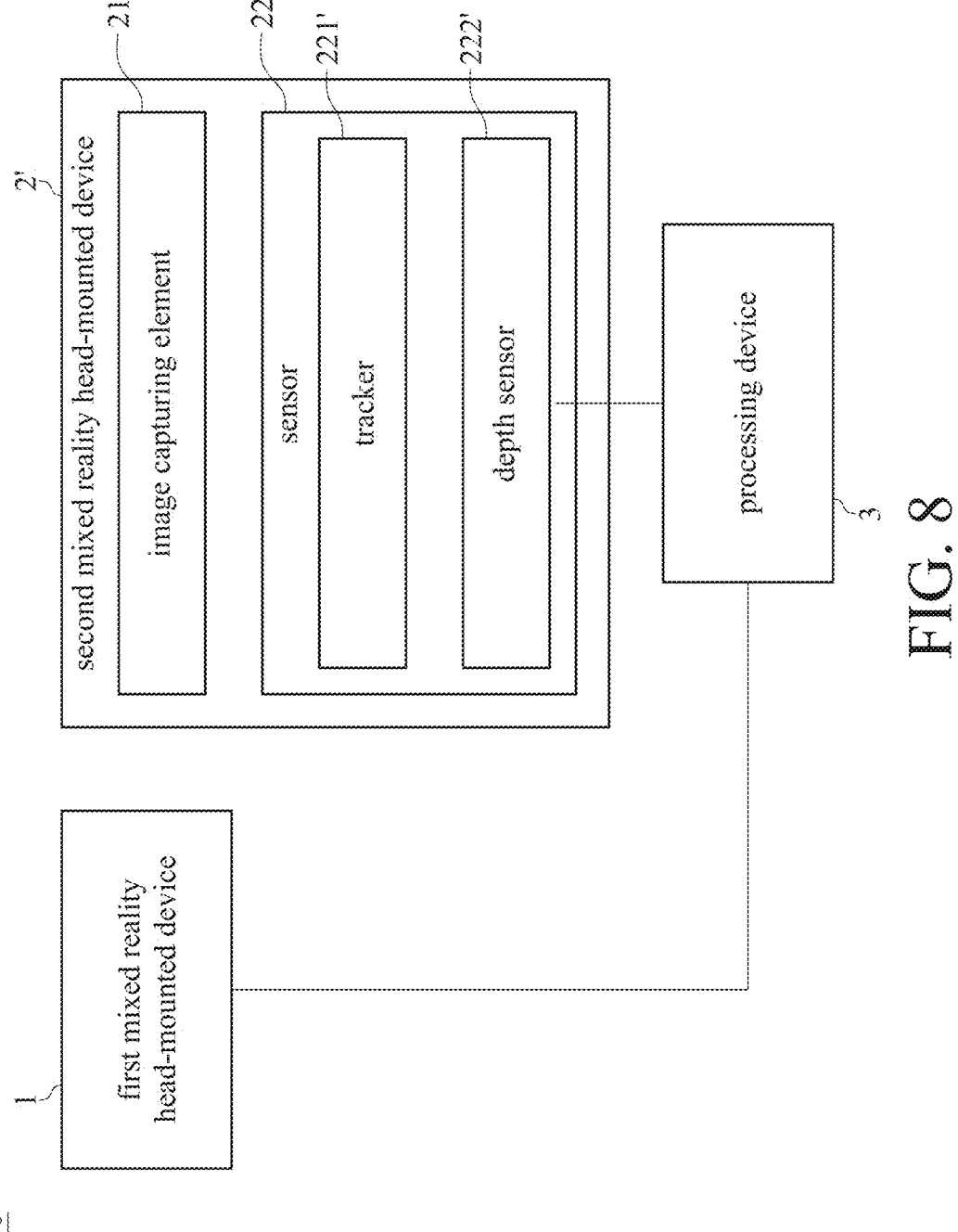
FIG. 8 is a block diagram illustrating a system of correcting depth of field according to another embodiment of the present disclosure.

Please refer to FIG. 8, wherein FIG. 8 is a block diagram illustrating a system 200 of correcting depth of field according to another embodiment of the present disclosure. As shown in FIG. 8, the system 200 of correcting depth of field includes a first MR head-mounted device 1, a second MR head-mounted device 2' and a processing device 3. The implementations and operations of the first MR head-mounted device 1 and the processing device 3 may be the same as that of the first MR head-mounted device 1 and the processing device 3 shown in FIG. 6, their descriptions are not repeated herein.

As shown in FIG. 8, the second MR head-mounted device 2' includes an image capturing element 21 and a sensor 22', wherein the implementations and operations of the image capturing element 21 may be the same as that of the image capturing element 21 shown in FIG. 6, its descriptions are not repeated herein. The sensor 22' is embedded on a shell of the second MR head-mounted device 2' (for example, glasses equipment). The sensor 22' may include an eye tracker 221' and a depth sensor 222'.

In the embodiment of the eye tracker 221', the perception data may be a pupil size of the user, and the depth-of-field parameter of the initial image may include the F number. When performing step S305 of FIG. 7, the processing device 3 may determine whether the pupil size is greater than the upper limit or smaller than the lower limit. The processing device 3 uses the determination result and the F number of the initial image as the training data when determining that the pupil size is greater than the upper limit. Accordingly, the trained depth-of-field correction model may generate images with lower F number to avoid a situation where the pupil size is smaller than the lower limit, and/or may generate images with higher F number to avoid a situation where the pupil size is greater than the upper limit. In other words, when the pupil size is greater than the upper limit, it means that the F number may not be enough, which causes a depth of field that is deeper than user requirement. Therefore, the F number of the depth-of-field correction model may be increased. On the contrary, when the pupil size is smaller than the lower limit, it means that the F number may be too high, which causes a depth of field that is not deep enough. Therefore, the F number of the depth-of-field correction model may be reduced. The interval between the upper limit and the lower limit may be a normal interval. That is, when the pupil size falls within the normal range, the current F number may be remained In the embodiment of the eye tracker 221', the perception data is an eye focus location of the user, and the depth-of-field parameter of the initial image may include the rendering range. When performing step S305 of FIG. 7, the processing device 3 may first determine whether the eye focus location overlaps the second virtual object, use the determination result of the eye focus location not overlapping the second virtual object and the initial image as the training data, and input the training data into the depth-of-field correction model for training. Therefore, the depth-of-field correction model may adjust the rendering range according to the determination result. In other words, the depth-of-field correction model may adjust the depth-of-field parameter used by the depth-of-field correction model based on the mapping relationship between the eye focus location and the second virtual object.

In the embodiment of the depth sensor 222', the perception data is a depth distance between the second MR head-mounted device 2' and a physical object in the second background image, and the depth-of-field parameter of the initial image may include the focal length. When performing step S305 of FIG. 7, the processing device 3 may use the depth distance and the focal length of as the training data. For example, the greater the depth distance, the trained depth-of-field correction model may adjust the focal length into a higher value.

What is claimed is:

1. A method of correcting depth of field, comprising performed by a first mixed reality (MR) head-mounted device:
   superimposing a first virtual object on a first background image to generate a superimposed image;
   inputting the superimposed image into a depth-of-field correction model to generate a displayed image and display the displayed image;
   receiving at least one user feedback signal corresponding to the displayed image; and
   updating a depth-of-field parameter of the depth-of-field correction model with the at least one user feedback signal for the depth-of-field correction model to generate an updated virtual object,
   wherein the method of correcting depth of field further comprises performed by a processing device:
      superimposing a second virtual object on a second background image obtained by a second MR head-mounted device to generate and display an initial image;
      obtaining perception data in response to the initial image from a sensor disposed at the second MR head-mounted device;
      generating training data according to the perception data and a depth-of-field parameter of the initial image; and
      performing training by using the training data to generate the depth-of-field correction model.

2. The method of correcting depth of field according to claim 1, wherein updating the depth-of-field parameter of the depth-of-field correction model with the at least one user feedback signal comprises:
   determining whether the at least one user feedback signal indicates a positive feedback result or a negative feedback result;

generating a first weight value corresponding to the depth-of-field parameter when determining that the at least one user feedback signal indicates the positive feedback result; and generating a second weight value corresponding to the depth-of-field parameter when determining that the at least one user feedback signal indicates the negative feedback result, wherein the first weight value is greater than the second weight value.

3. The method of correcting depth of field according to claim 1, wherein the at least one user feedback signal indicates a pupil size, the depth-of-field parameter comprises an F number, and updating the depth-of-field parameter of the depth-of-field correction model with the at least one user feedback signal comprises:

determining whether the pupil size is greater than an upper limit or smaller than a lower limit;

increasing the F number when determining that the pupil size is greater than the upper limit; and decreasing the F number when determining that the pupil size is smaller than the lower limit.

4. The method of correcting depth of field according to claim 1, wherein the at least one user feedback signal indicates an eye focus location, the depth-of-field parameter comprises a rendering range, and updating the depth-of-field parameter of the depth-of-field correction model with the at least one user feedback signal comprises:

adjusting the rendering range when determining that the eye focus location does not overlap the first virtual object.

5. The method of correcting depth of field according to claim 1, wherein the at least one user feedback signal indicates a depth distance between the first MR head-mounted device and a physical object in the first background image, the depth-of-field parameter comprises a focal length, and updating the depth-of-field parameter of the depth-of-field correction model with the at least one user feedback signal comprises:

adjusting the focal length.

6. The method of correcting depth of field according to claim 1, wherein the perception data comprises a pupil size, and generating the training data according to the perception data and the depth-of-field parameter of the initial image comprises:

determining whether the pupil size is greater than an upper limit or smaller than a lower limit; and using a determination result of determining that the pupil size is greater than the upper limit or smaller than the lower limit and an F number of the initial image as the training data.

7. The method of correcting depth of field according to claim 1, wherein the perception data comprises an eye focus location, and generating the training data according to the perception data and the depth-of-field parameter of the initial image comprises:

using a determination result of determining that the eye focus location does not overlap the second virtual object and a rendering range of the initial image as the training data.

8. The method of correcting depth of field according to claim 1, wherein the perception data comprises a depth distance between the second MR head-mounted device and a physical object in the second background image, and generating the training data according to the perception data and the depth-of-field parameter of the initial image comprises:

using the depth distance and a focal length of the initial image as the training data.

9. A system of correcting depth of field, comprising:

a first mixed reality (MR) head-mounted device, comprising:

a photographing element configured to obtain a first background image;

a memory configured to store a depth-of-field correction model;

a user input element configured to obtain at least one user feedback signal; and a processing device connected to the photographing element, the memory and the user input element, and configured to perform:

superimposing a first virtual object on the first background image to generate a superimposed image;

inputting the superimposed image into the depth-of-field correction model to generate a displayed image and display the displayed image;

receiving the at least one user feedback signal corresponding to the displayed image; and updating a depth-of-field parameter of the depth-of-field correction model with the at least one user feedback signal for the depth-of-field correction model to generate an updated virtual object; and a second MR head-mounted device configured to obtain a second background image and comprising a sensor; and another processing device connected to the first MR head-mounted device and the second MR head-mounted device and configured to perform: superimposing a second virtual object on the second background image to generate and display an initial image; obtaining perception data in response to the initial image from the sensor; generating training data according to the perception data and a depth-of-field parameter of the initial image; and performing training by using the training data to generate the depth-of-field correction model.

10. The system of correcting depth of field according to claim 9, wherein the processing device is configured to determine whether the at least one user feedback signal indicates a positive feedback result or a negative feedback result, generate a first weight value corresponding to the depth-of-field parameter when determining that the at least one user feedback signal indicates the positive feedback result, and generate a second weight value corresponding to the depth-of-field parameter when determining that the at least one user feedback signal indicates the negative feedback result, wherein the first weight value is greater than the second weight value.

11. The system of correcting depth of field according to claim 9, wherein the depth-of-field parameter comprises an F number, and the user input element comprises:

an eye tracker configured to generate a pupil size of the at least one user feedback signal, wherein the processing device is configured to increase the F number when the pupil size is greater than an upper limit, and decrease the F number when the pupil size is smaller than a lower limit.

12. The system of correcting depth of field according to claim 9, wherein the depth-of-field parameter comprises a rendering range, and the user input element comprises:

an eye tracker configured to generate an eye focus location of the at least one user feedback signal, wherein the processing device is configured to adjust the rendering range when the eye focus location does not overlap the first virtual object.

13. The system of correcting depth of field according to claim 9, wherein the depth-of-field parameter comprises a focal length, and the user input element comprises:

a depth sensor configured to generate a depth distance of the at least one user feedback signal, wherein the depth distance is used to adjust the focal length.

14. The system of correcting depth of field according to claim 9, wherein the sensor comprises an eye tracker configured to generate a pupil size of the perception data, wherein the another processing device is configured to determine whether the pupil size is greater than an upper limit or smaller than a lower limit, and use a determination result and an F number of the initial image as the training data.

15. The system of correcting depth of field according to claim 9, wherein the sensor comprises an eye tracker configured to generate an eye focus location of the perception data, wherein the another processing device is configured to use a determination result of determining the eye focus location not overlapping the second virtual object and a rendering range of the initial image as the training data.

16. The system of correcting depth of field according to claim 9, wherein the sensor comprises a depth sensor configured to generate a depth distance of the perception data between the second MR head-mounted device and a physical object in the second background image, wherein the processing device is configured to use the depth distance and a focal length of the initial image as the training data.

* * * * *